United States Patent
Paul et al.

(10) Patent No.: US 10,106,231 B1
(45) Date of Patent: Oct. 23, 2018

(54) THERMAL PROTECTION SEAT COVER FOR PERSONAL WATERCRAFT

(71) Applicants: John R. Paul, Kingwood, TX (US); Eduard J. Trujillo, Cedar Park, TX (US)

(72) Inventors: John R. Paul, Kingwood, TX (US); Eduard J. Trujillo, Cedar Park, TX (US)

(*) Notice: Subject to any disclaimer, the term of this patent is extended or adjusted under 35 U.S.C. 154(b) by 0 days.

(21) Appl. No.: 14/613,341

(22) Filed: Feb. 3, 2015

Related U.S. Application Data

(60) Provisional application No. 61/935,317, filed on Feb. 3, 2014.

(51) Int. Cl.
| | | |
|---|---|---|
| *A47C 31/00* | (2006.01) | |
| *B63B 35/85* | (2006.01) | |
| *B60N 2/60* | (2006.01) | |
| *B63B 35/73* | (2006.01) | |
| *B63B 29/04* | (2006.01) | |

(52) U.S. Cl.
CPC ............ *B63B 35/85* (2013.01); *B60N 2/6027* (2013.01); *B63B 35/731* (2013.01); *B63B 2029/043* (2013.01)

(58) Field of Classification Search
CPC . B62J 1/20; B60N 2/6036; B60N 2/60; B60N 2/6018; B60N 2/6054; B62B 9/142; B62B 9/145
USPC ......... 297/184.1, 219.1; 114/361; 296/136.1, 296/136.12, 136.11, 136.01; 135/161, 135/125, 96, 88.01, 88.13; 150/167, 166
See application file for complete search history.

(56) References Cited

U.S. PATENT DOCUMENTS

| | | | |
|---|---|---|---|
| 1,853,742 A | 4/1932 | Owen et al. | |
| 3,537,746 A | 11/1970 | Peters | |
| 4,283,084 A | 8/1981 | Gallagher | |
| 4,458,738 A * | 7/1984 | Wilson | B60J 1/2011 150/154 |
| 4,938,522 A * | 7/1990 | Herron | B60J 11/00 150/166 |

(Continued)

*Primary Examiner* — Chi Q Nguyen
(74) *Attorney, Agent, or Firm* — Kenneth A. Roddy

(57) ABSTRACT

A removable thermal protection seat cover for a personal watercraft has a pair of front mounting straps extending a distance forwardly from a front edge that fasten around the steering column, a pair of rear mounting straps extending a distance rearwardly from a rear edge that fasten around either of the tow hook or a grab handle at the rear of the watercraft, and corner pockets that contain weighting material to increase the weight of the cover at the corners thereof. The seat cover covers the seat from front to back and extends downward along at least a portion of the lateral sides of the raised pedestal beneath the seat to protect the buttocks and legs of the rider from burns due to heating of the seat and pedestal by exposure to hot sun and from heat generated by the enclosed engine compartment. The seat cover is removably maintained in place, prior to and during operation of the watercraft, by the front and rear mounting straps and the weighting material in the corner pockets, and the weighted corner pockets prevent the seat cover from flapping in the wind or becoming detached and causing distraction and potential injury to the rider during operation of the personal watercraft.

5 Claims, 3 Drawing Sheets

(56) References Cited

U.S. PATENT DOCUMENTS

| | | | | |
|---|---|---|---|---|
| 5,080,431 A | * | 1/1992 | Frazier | B62J 1/20 |
| | | | | 297/184.11 |
| 5,458,945 A | * | 10/1995 | Tall | B60J 11/00 |
| | | | | 150/166 |
| 5,488,981 A | * | 2/1996 | Burkhart | A01M 29/30 |
| | | | | 150/166 |
| 6,003,929 A | * | 12/1999 | Birdsell | B60P 7/0876 |
| | | | | 150/166 |
| 6,059,105 A | * | 5/2000 | Allain | B60J 11/00 |
| | | | | 150/166 |
| 6,213,046 B1 | | 4/2001 | Lawson | |
| 6,394,528 B2 | * | 5/2002 | Hoenack | B60J 11/00 |
| | | | | 150/160 |
| 6,516,844 B1 | | 2/2003 | Henry | |
| 6,779,827 B2 | * | 8/2004 | Clark | B60J 11/04 |
| | | | | 296/136.01 |
| 7,416,250 B1 | | 8/2008 | DiFilippo | |
| 8,556,338 B1 | * | 10/2013 | Gore | B60N 2/6027 |
| | | | | 297/182 |
| 8,950,416 B1 | * | 2/2015 | Spellman | B63B 17/02 |
| | | | | 114/361 |
| 9,004,088 B1 | * | 4/2015 | Nicheporuck | E04H 15/06 |
| | | | | 135/115 |
| 9,027,499 B1 | * | 5/2015 | Clarke | B63B 17/02 |
| | | | | 114/361 |
| 9,533,557 B2 | * | 1/2017 | Staudt | B60J 11/04 |
| 2004/0026965 A1 | * | 2/2004 | Haney | B60N 2/6009 |
| | | | | 297/184.13 |
| 2007/0145798 A1 | * | 6/2007 | Nadler-Sachs | A47C 31/113 |
| | | | | 297/228.1 |
| 2009/0025843 A1 | | 1/2009 | Keeler | |
| 2012/0112502 A1 | * | 5/2012 | Cristoforo | A47C 31/11 |
| | | | | 297/188.01 |

\* cited by examiner

THERMAL PROTECTION SEAT COVER FOR PERSONAL WATERCRAFT

CROSS REFERENCE TO RELATED APPLICATION

This application claims priority of U.S. Provisional Application Ser. No. 61/935,317, filed Feb. 3, 2014.

BACKGROUND OF THE INVENTION

1. Field of the Invention

This invention relates generally to protective set covers and, more particularly, to a thermal protection seat cover for personal watercraft that covers the seat and lateral sides of the pedestal beneath the seat that encloses than engine compartment to protect the buttocks and legs of the rider from burns prior to and during use.

2. Background Art

As used herein, the term "personal watercraft", means a motorized recreational water vehicle ridden by straddling a seat. The conventional personal watercraft typically has an inboard engine driving a pump jet that has a screw-shaped impeller to create thrust for propulsion and steering. The United States Coast Guard defines a personal watercraft, amongst other criteria, as a jet drive boat less than 13 feet in length, in order to exclude from that definition more conventional sized jet boats. Most are designed for two or three people, though four-passenger models exist, and they come in various shapes and sizes. They are referred by the trademarked brand names such as, for example: the "WaveRunner"®, manufactured by Yamaha Motor Corporation of Kennesaw, Ga.; the "Jet Ski"®, manufactured by Kawasaki Motors Corp. of Santa Ana, Calif.; and the "Sea-Doo"®, manufactured by Bombadier Recreational Products, Inc., of Sturtevant, Wis.

A conventional personal watercraft includes a hull and a deck. The space between the hull and the deck forms the engine compartment that accommodates the engine, muffler, tuning pipe, gas tank, electrical system, battery, and other components and is covered by a centrally positioned raised pedestal. A straddle-type seat is positioned on top of the pedestal to accommodate a rider in a straddling position. The seat may be sized to accommodate a single rider or sized for multiple riders. Footrests or foot wells extend along the sides of the watercraft adjacent to the lower end of the pedestal to support the feet of the rider(s) straddling the seat in various riding positions. A grab handle may be provided between the pedestal and the rear of the seat onto which a passenger may hold. This arrangement is particularly convenient for a passenger seated facing backwards for spotting a water skier, for example. Typically a tow hook is mounted on the pedestal beneath the grab handle which is used for towing a skier or floatation device, such as an inflatable water toy. A helm assembly is positioned forwardly of the seat and has a central helm portion which includes a steering column with a pair of handlebars mounted thereon for steering the watercraft and left and right steering handles. One of the steering handles is provided with a throttle operator and the other is provided with a lever used by the driver to control the jet propulsion system.

One of the problems associated with a personal watercraft is that it typically sits in the water and is exposed to the sun all day and, as a result, the seat becomes very hot to the point where is uncomfortable to sit on and straddle. The lateral sides of the raised pedestal beneath the seat also become heated due to the exposure to sun and the heat generated by the enclosed engine compartment. Needless to say, the riders of the personal watercraft are usually wearing swimming trunks, swimsuits, or shorts, leaving their bare legs exposed, and their buttocks and legs are often burned when sitting on and straddling the hot seat.

A problem in attempting to provide a seat cover that would protect the rider's buttocks and legs when sitting on and straddling the hot seat stems from the large variety of designs, shapes, and sizes of the personal watercraft seats, as well as the seating arrangements and conditions encountered in the watercraft's operation. Another problem is that the variations in the watercraft design, shape, size, and the sizes of the seats, makes the provision of a suitable universal means of attachment of a thermal protection seat cover very difficult to achieve. Still another problem in attempting to provide a thermal protection seat cover that would protect the rider's buttocks and legs when sitting on and straddling the watercraft seat is that the conditions under which the watercraft is operated can cause a seat cover to flap around in the wind, or even become detached, causing distraction and potential injury to the operator and/or passengers.

There are several patents and patent applications that are directed toward covers for personal watercraft that cover the entire watercraft to protect it from the elements, much like a boat cover, and are removed when the watercraft is in operation. There are several patents and patent applications that are directed toward seat covers for vehicles, such as motorcycles, having seat that straddled when the vehicle is ridden. The following are some examples.

Owen et al, U.S. Pat. No. 1,853,742, discloses a rain guard for motor cycles or the like which comprises a spring actuated roller or the like rotatably mounted on the rear (or front) part of the cycle, a guarding cloth wound on the roller and adapted to be wound off the same and be drawn over the cycle against the tension of the spring, the free end of the guarding cloth being then secured to the front (or back) part of the cycle. The guarding cloth may, preferably, be provided with an opening for the head of the rider for enabling the rain guard to be used during driving the cycle.

Peters, U.S. Pat. No. 3,537,746, discloses a normally retracted, controllably extendable protective cover for a motorcycle seat and adjacent, underlying portions of a motorcycle. The cover comprises a flexible, waterproof sheet having a central portion adapted to overlie and protect the motorcycle seat, and having side portions adapted to extend downwardly on each side of the motorcycle seat and underlying upper portions of a motorcycle so as to laterally, at least partially, encompass and protect the same from the elements. When the motorcycle is driven, the cover is removed, folded and received within a storage chamber mounted behind or ahead of the motorcycle seat.

Gallagher, U.S. Pat. No. 4,283,084, discloses a removable lightweight covering for protecting a motorcycle from the elements which extends from the back of a motorcycle seat to the front of the tank and covers both sides of the engine. Side loops are provided for securing the cover to corresponding motorcycle foot posts and opposing front corners are adapted to overlap in front of the engine and releasably attach to each other. When the motorcycle is driven, the cover is removed and folded into a compact hand-size package.

Lawson, U.S. Pat. No. 6,213,046, discloses a removable protective cover for watercraft having a rigid upper shell which contours the upper portion of the watercraft. The rigid upper shell has a peripheral flange which rests on the watercraft, particularly on a rub rail surrounding the hull of the watercraft. An overhanging hitch is connected to a nose end of the protective cover and contours to the bow. By seating the bow in the hitching cavity, the nose end of the protective cover is releasably secured to the bow. Furthermore, the protective cover has an aperture at the tail end which is used to secure the tail end to the stern upon first seating the bow.

Henry, U.S. Pat. No. 6,516,844, discloses a sunscreen protector for motorcycles that covers only the seat and fuel tank area to protect these components from the deteriorating effects of sunlight. The protector shade includes a rectangular sheet of tightly woven nylon/lycra elastomeric material sized to cover only the motorcycle seat and fuel tank. Four elastic strap members and a plurality of hook loop members with attached, coated, J-hook members are employed for attachment to selected attachment points on the motorcycle. Since the sunscreen protector is sized to cover only the seat and fuel tank areas, the motorcycle can be operated with the sunscreen protector in place, if desired, it may be removed.

DiFilippo, U.S. Pat. No. 7,416,250, discloses a pliable motorcycle seat cover having an elastic strap positioned along the hem of the seat cover to maintain the selective positioning thereof. The cover is comprised of a flexible sheet fabricated of a chemically resistive material having waterproof and soil proof capabilities for protecting the seat top and sides. The seat cover is designed to protect the seat during application of detergents and cleaners and keep the seat dry during inclement weather.

Keeler, published U.S. Patent Application 2009/0025843, discloses a removable protective vehicle cover for motorcycles and similarly designed vehicles for protecting the upper surface of the vehicle from the elements. A cover sheet component protects vehicle structures disposed rearward of the handlebars and incorporates two front mounting elements for releasably receiving forward structures of the vehicle. The cover sheet is deployed in a generally horizontal plane and provides minimal wind resistance to any such lateral forces. An optional cover module protects vehicle components disposed forward of the handlebars and may be releasably attached to the front edge of the cover sheet. A storage pouch may be integrally incorporated with the vehicle cover for storage and portability of the vehicle cover when not in use.

Most of these types of seat covers are designed to protect the seat from the elements, and are removed when the vehicle is driven. Although they may be suitable for protecting a vehicle seat from the elements, they are not particularly designed to fit a personal watercraft seat and pedestal, and would be incapable of protecting the buttocks and legs of a rider from burns when straddling a personal watercraft seat due to heating of the seat and pedestal by exposure to hot sun and heat generated by the enclosed engine compartment.

SUMMARY OF THE INVENTION

The present invention overcomes the aforementioned problems and is distinguished over the prior art in general, and these patents in particular by a removable thermal protection seat cover for a personal watercraft for covering the watercraft seat and lateral sides of a raised pedestal beneath the seat that encloses the engine compartment to protect the buttocks and legs of a rider from burns due to heating of the seat and pedestal by exposure to hot sun and heat generated by the enclosed engine compartment. The removable seat cover is formed of a flexible sheet of waterproof and heat resistant fabric material having a front edge, a rear edge, elongate opposed lateral side edges, and corner pockets disposed at the intersection thereof. The seat cover is of sufficient length and width to cover the watercraft seat and lateral sides of the raised pedestal beneath the seat. A weighting material is disposed in the respective corner pockets to increase the weight of the seat cover at the corners thereof. A pair of front mounting straps extending a distance forwardly from the front edge have mating releasable fasteners at outer ends thereof for releasably mounting the front mounting straps around a steering column of the watercraft, and a pair of rear mounting straps extending a distance rearwardly from the rear edge have mating releasable fasteners at outer ends thereof for releasably mounting the rear mounting straps on either of a tow hook or a grab handle at the rear of the watercraft.

In an installed condition, the seat cover covers the personal watercraft seat from front to back and extends downward along the lateral sides of the of the raised pedestal beneath the seat to protect the buttocks and legs of the rider from burns due to heating of the seat and pedestal by exposure to hot sun and from heat generated by the enclosed engine compartment. The seat cover is removably maintained in place, prior to and during operation of the watercraft, by the front and rear mounting straps and the weighting material in the corner pockets, and the weighting material in the corner pockets prevent the seat cover from flapping in the wind or becoming detached and causing distraction and potential injury to the rider during operation of the personal watercraft.

One of the significant features and advantages of the present thermal protection seat cover for personal watercraft is that it covers the watercraft seat and lateral sides of the raised pedestal beneath the seat that encloses the engine compartment to protect the buttocks and legs of the rider from burns due to heating of the seat and pedestal by exposure to the hot sun and the heat generated by the enclosed engine compartment.

Another significant feature and advantage of the present thermal protection seat cover for personal watercraft is that it can selectively remain in place prior to and during operation of the watercraft to protect the buttocks and legs of the rider from burns due to heating of the seat and pedestal by exposure to the hot sun and the heat generated by the enclosed engine compartment.

Another significant feature and advantage of the present thermal protection seat cover for personal watercraft is that it is weighted and attached to the watercraft to prevent it from flapping in the wind or becoming detached and causing distraction and potential injury to the operator and/or passengers.

Another significant feature and advantage of the present thermal protection seat cover for personal watercraft is that it has a universal means of attachment and is configured to cover the watercraft seat and lateral sides of the raised pedestal beneath the seat enclosing the engine compartment of a large variety of designs, shapes, and sizes of personal watercraft, as well as the seating arrangements and conditions encountered in the watercraft's operation.

Another feature and advantage of the present thermal protection seat cover for personal watercraft is that it may be provided with pockets for storing small items.

Another feature and advantage of the present thermal protection seat cover for personal watercraft is that it may be used to cover the watercraft seat and lateral sides of the raised pedestal beneath the seat enclosing the engine compartment when the watercraft is stored.

A further feature and advantage of the present thermal protection seat cover for personal watercraft is that it can be easily and quickly installed on and removed from the watercraft without the use of tools.

A still further feature and advantage of the present thermal protection seat cover for personal watercraft is that it is simple in construction, inexpensive to manufacture, and rugged and reliable in use.

Other features and advantages of the invention will become apparent from time to time throughout the specification and claims as hereinafter related.

DESCRIPTION OF THE PREFERRED EMBODIMENT

Figure 1:
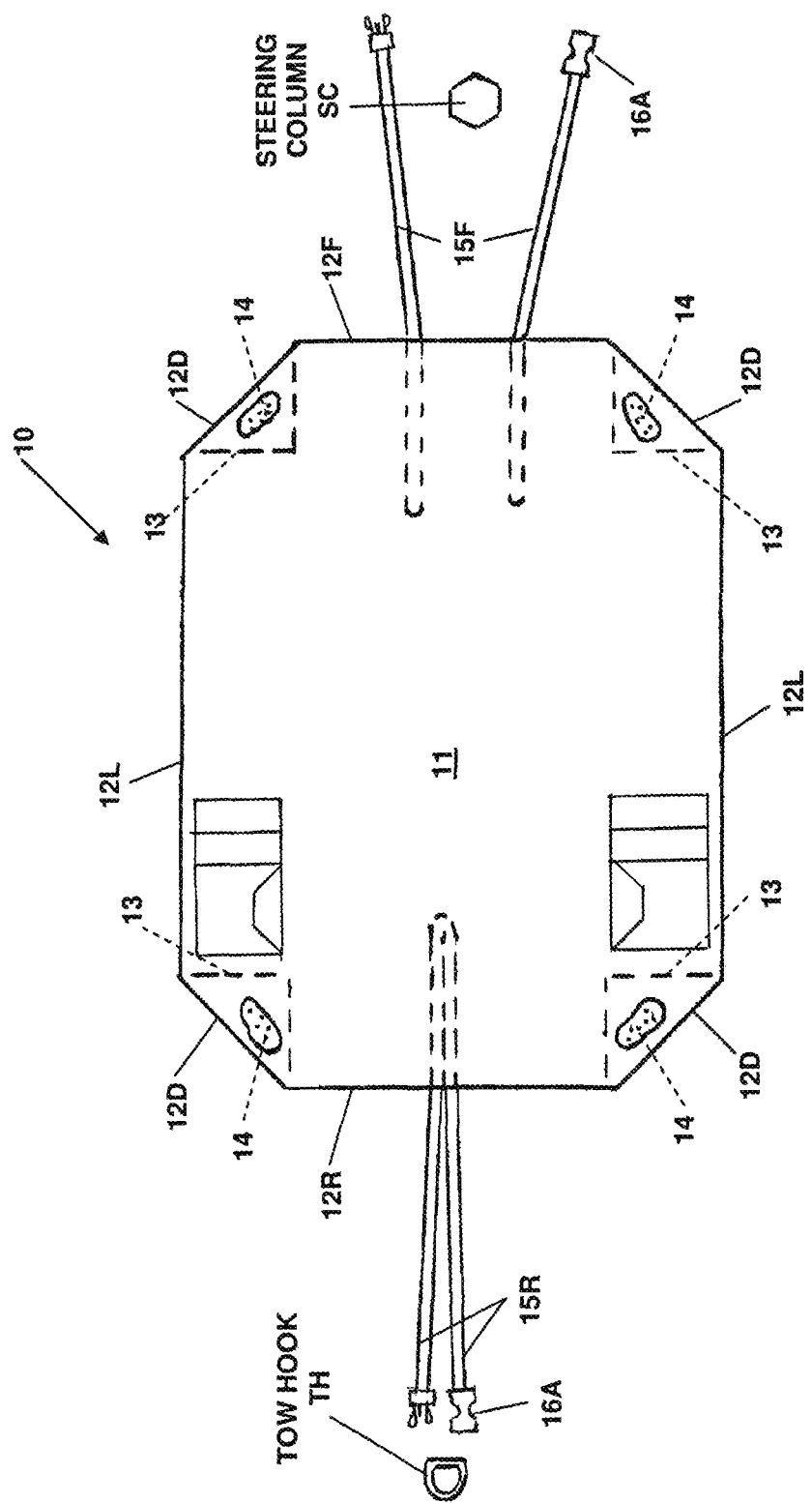
FIG. 1 is top plan view of the thermal protection seat cover for personal watercraft in accordance with the present invention.
Figure 2:
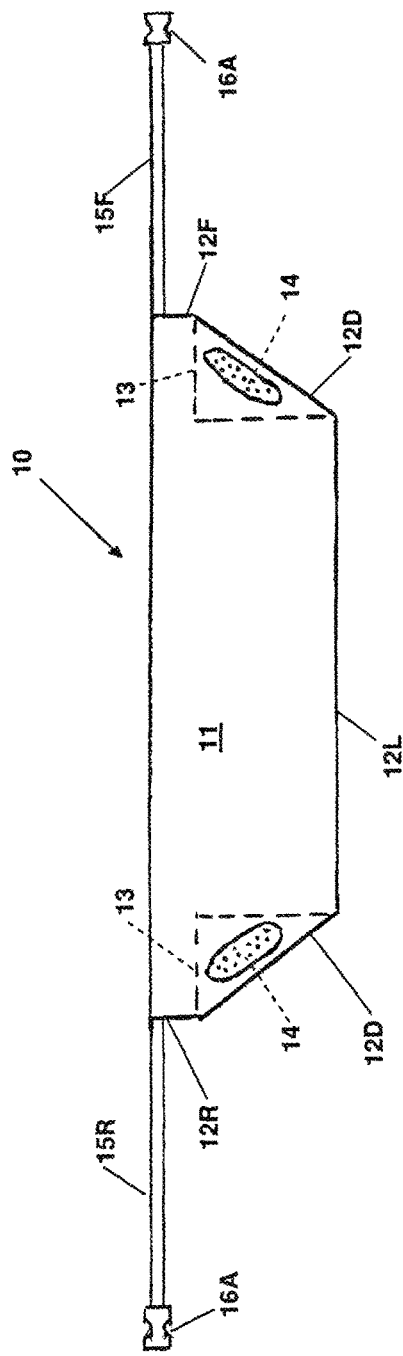
FIG. 2 is a side elevation of the thermal protection seat cover for personal watercraft.
Figure 3:
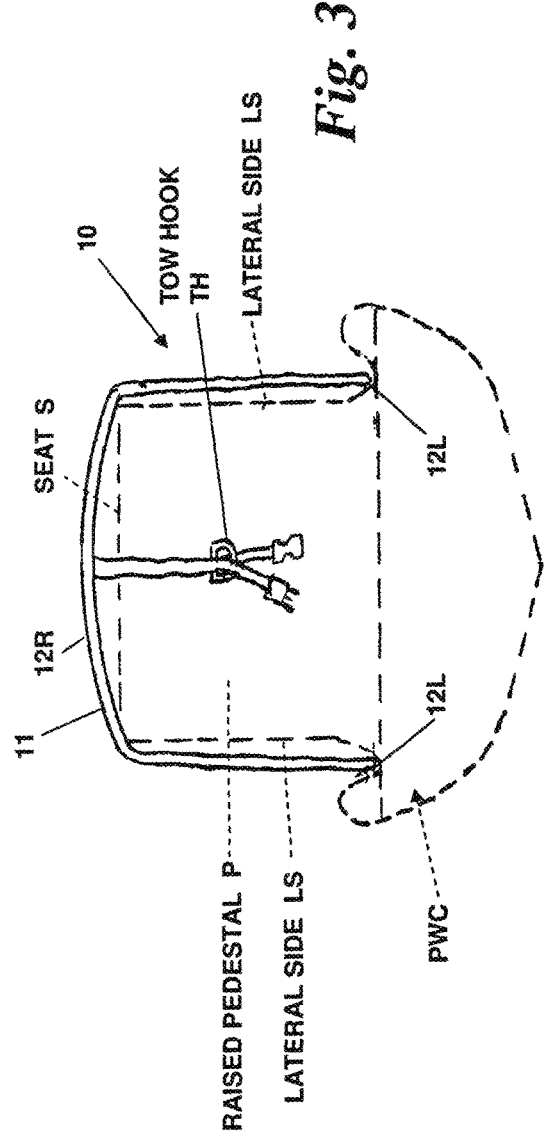
FIG. 3 is a rear end view of the thermal protection seat cover, shown placed over the seat and covering the lateral sides of the raised pedestal of a personal watercraft.

Referring to the drawings by numerals of reference, there is shown in FIGS. 1-3, a preferred thermal protection seat cover 10 for a personal watercraft PWC. The thermal protection seat cover 10 is primarily intended to cover the seat S and lateral sides LS of the raised pedestal P beneath the seat of the personal watercraft PWC that encloses the engine compartment to protect the buttocks and legs of a rider from burns due to heating of the seat and pedestal by exposure to the hot sun and the heat generated by the enclosed engine compartment.

The thermal protection seat cover 10 is constructed of a flexible sheet 11 of washable, waterproof and heat resistant fabric. The flexible sheet 11 is initially a generally rectangular configuration having a front edge 12F and a rear edge 12R spaced in parallel relation, and elongate opposed lateral side edges 12L. Each of the four corners of the initially rectangular sheet 11 are folded diagonally and secured to the underside of the sheet by stitching or other suitable fastener means to form corner pockets 13 on the underside of the sheet that enclose respective weights 14 or other weighting material pockets to increase the weight of the seat cover at corners thereof. Thus, the overall shape of the seat cover 10, as seen from the top in FIG. 1, in a flat uninstalled condition is a generally octagonal configuration having a front edge 12F and a rear edge 12R spaced in parallel relation, and elongate opposed lateral side edges 12L which are adjoined by four relatively short diagonal edges 12D.

In a preferred embodiment, but not limited thereto, the weights 14 installed in the pockets 13 at the four corners of the thermal protection seat cover 10 are sandbags. It should be understood that other types of weight materials may be utilized to increase the weight of the seat cover at corners thereof, such as lead weights or other suitable water resistant weight materials. It should also be understood that the corner pockets 13 at the four corners of the thermal protection seat cover 10 may be provided with a opening whereby a user may place sand or other suitable weight materials into the pockets. The corner pockets 13 may also be filled with water at the point of use to increase the weight of the seat cover at the corners thereof.

A pair of elongate front mounting straps 15F formed of webbing are secured at one end to the underside of the sheet 11 by stitching or other suitable fastener means and extend a distance forwardly from the front edge 12F. A pair of elongate rear mounting straps 15R formed of webbing are secured at one end to the underside of the sheet 11 by stitching or other suitable fastener means and extend a distance rearwardly from the rear edge 12R. The outer ends of the front mounting straps 15F and the rear mounting straps 15R are each provided with releasable fasteners 16A, such as a side release buckle having mating fasteners on the outer end of the mounting straps, a buckle on one strap that releasably engages the outer end of the other strap, mating hook and loop fasteners, or other conventional releasable fasteners.

The thermal protection seat cover 10 may also be provided with one or more accessory pouches or pockets 17 secured to the top surface of the sheet 11 by stitching or other suitable fastener means for storing small items.

The thermal protection seat cover 10 is of sufficient length and width to cover the seat S and lateral sides LS of the raised pedestal P beneath the seat of the personal watercraft PWC that encloses the engine compartment.

Figure 4:
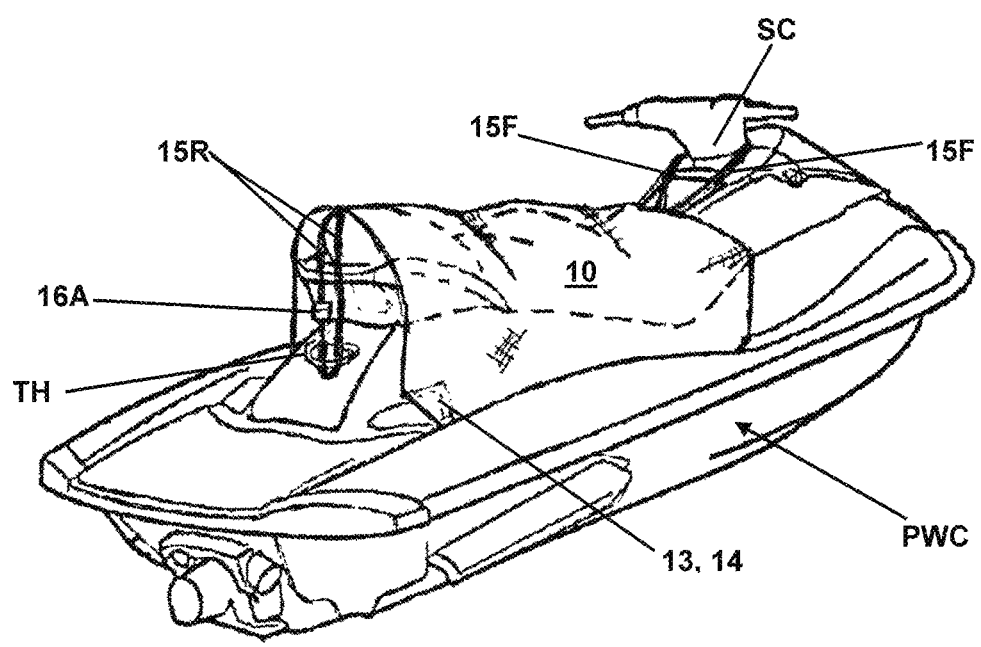
FIG. 4 is a perspective illustration showing the thermal protection seat cover placed over the seat and lateral sides of the raised pedestal of the personal watercraft.

Referring additionally to FIG. 4, in an installed condition, the front mounting straps 15F that extend forwardly from the front edge 12F of the thermal protection seat cover 10 are releasably fastened around the steering column SC of the personal watercraft PWC beneath the handlebars. The rear mounting straps 15R that extend rearwardly from the rear edge 12R of the thermal protection seat cover 10 are releasably fastened around or through the tow hook TH mounted on the watercraft pedestal beneath the grab handle which is used for towing a skier or floatation device. In some installations, the rear mounting straps 15R may be releasably fastened around or through the grab handle between the pedestal and the rear of the passenger seat of the watercraft.

When the thermal protection seat cover 10 is installed, it covers the watercraft seat from front to back and the sides of the cover extend downward along the lateral sides of the of the raised pedestal beneath the seat to protect the buttocks and legs of the rider from burns due to heating of the seat by exposure to the hot sun and the heat generated by the enclosed engine compartment. The front and rear mounting straps 15F and 15R and the weights 14 in the pockets 13 at the four corners of the thermal protection seat cover 10 maintain the cover 10 in place prior to and during operation of the watercraft. The weights 14 in the pockets 13 at the four corners of the thermal protection seat cover 10 also prevent it from flapping in the wind or becoming detached and causing distraction and potential injury to the operator and/or passengers during operation of the watercraft.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. A removable thermal protection seat cover in combination with a personal watercraft, comprising:
   a personal watercraft having a steering column and an enclosed engine compartment enclosed by a raised pedestal having lateral sides and a seat at the top thereof and either of a tow hook or a grab handle disposed at a rear portion of said personal watercraft;
   said removable thermal protection seat cover formed of a flexible sheet of waterproof and heat resistant fabric material having a front edge, a rear edge, elongate opposed lateral side edges, and corner pockets disposed at corners thereof, said seat cover having a length and width sized to cover said watercraft seat and said lateral sides of said raised pedestal beneath said seat;
   weighting material disposed in respective said corner pockets to increase the weight of said seat cover at the corners thereof, said weighting material selected from the group consisting of sandbags, lead weights, sand, and water; and
   a pair of front mounting straps extending a distance forwardly from said front edge having a first set of mating releasable fasteners at outer ends thereof for releasably fastening said front mounting straps around said steering column of said personal watercraft and releasably connect said front edge with said steering column, and a pair of rear mounting straps extending a distance rearwardly from said rear edge having a second set of mating releasable fasteners at outer ends thereof for releasably fastening said rear mounting straps around either of said tow hook or said grab handle of said personal watercraft and releasably connect said rear edge with either of said tow hook or said grab handle;
   said seat cover, in an installed condition, is supported on said personal watercraft seat to cover said seat from front to back and extends downward along said lateral sides of said raised pedestal beneath said seat to protect the buttocks and legs of the rider from burns due to heating of said seat and pedestal by exposure to hot sun and from heat generated by said enclosed engine compartment, and
   said seat cover is removably maintained in place, prior to and during operation of the watercraft, by said front and rear mounting straps and said weighting material in said corner pockets, and said weighting material in said corner pockets prevents said seat cover from flapping in the wind or becoming detached and causing distraction and potential injury to the rider during operation of said personal watercraft.

2. The removable thermal protection seat cover according to claim 1, further comprising:
   at least one accessory pocket on a top surface of said sheet for storing small items.

3. A removable thermal protection seat cover in combination with a personal watercraft, comprising:
   a personal watercraft having a steering column and an enclosed engine compartment enclosed by a raised pedestal having lateral sides and a seat at the top thereof and either of a tow hook or a grab handle disposed at a rear portion of said personal watercraft;
   said removable thermal protection seat cover formed of a flexible sheet of waterproof and heat resistant fabric material having a front edge, a rear edge, elongate opposed lateral side edges, and corner pockets disposed at corners thereof, said seat cover having a length and width sized to cover said watercraft seat and said lateral sides of said raised pedestal beneath said seat, and said corner pockets configured to receive and contain weighting material selected from the group consisting of sandbags, lead weights, sand, and water to increase the weight of said seat cover at corners thereof; and
   a pair of front mounting straps extending a distance forwardly from said front edge having a first set of mating releasable fasteners at outer ends thereof for releasably fastening said front mounting straps around said steering column of said personal watercraft and releasably connect said front edge with said steering column, and a pair of rear mounting straps extending a distance rearwardly from said rear edge having a second set of mating releasable fasteners at outer ends thereof for releasably fastening said rear mounting straps around either of said tow hook or said grab handle of said personal watercraft and releasably connect said rear edge with either said tow hook or said grab handle;
   said seat cover, in an installed condition, is supported on said personal watercraft seat to cover said seat from front to back and extends downward along said lateral sides of said raised pedestal beneath said seat to protect the buttocks and legs of the rider from burns due to heating of said seat and pedestal by exposure to hot sun and from heat generated by said enclosed engine compartment, and
   when said weighting is contained in said corner pockets, said seat cover is removably maintained in place, prior to and during operation of said personal watercraft, by said front and rear mounting straps and said weighting material in said corner pockets, and said weighting material in said corner pockets prevents said seat cover from flapping in the wind or becoming detached and causing distraction and potential injury to the rider during operation of said personal watercraft.

4. The removable thermal protection seat cover according to claim 3, further comprising:
   at least one accessory pocket on a top surface of said sheet for storing small items.

5. A method for protecting the buttocks and legs of a rider of a personal watercraft from burns, the personal watercraft having a steering column and an enclosed engine compartment enclosed by a raised pedestal having lateral sides and a seat at the top thereof and either of a tow hook or a grab handle disposed at a rear portion of the personal watercraft, the method comprising the steps of:
   providing a removable thermal protection seat cover formed of a flexible sheet of waterproof and heat resistant fabric material having a front edge, a rear edge, elongate opposed lateral side edges and corner pockets disposed at corners thereof, a pair of front mounting straps extending a distance forwardly from said front edge having a first set of mating releasable fasteners at outer ends thereof, a pair of rear mounting straps extending a distance rearwardly from said rear edge having a second set of mating releasable fasteners at outer ends thereof, said seat cover having a length and width sized to cover the watercraft seat and the lateral sides of the raised pedestal beneath the seat, and said corner pockets weighted to increase the weight of said seat cover at said corners thereof;
   placing said seat cover over the seat of the personal watercraft; and releasably connecting said front mounting straps around the steering column of the personal watercraft and releasably connecting said rear mounting straps around either of the tow hook or the grab handle disposed at the rear portion of the personal watercraft, such that said seat cover is supported on the personal watercraft seat to cover the seat from front to back and extend downward along the lateral sides of the raised pedestal beneath the seat to protect the buttocks and legs of the rider from burns due to heating of the seat and pedestal by exposure to hot sun and from heat generated by the enclosed engine compartment, and said weighted corner pockets prevent said seat cover from flapping in the wind or becoming detached and causing distraction and potential injury to the rider during operation of the personal watercraft.

\* \* \* \* \*